No. 711,863. Patented Oct. 21, 1902.
J. C. HUMPHREYS.
VALVE OPERATING MECHANISM.
(Application filed May 24, 1901.)
(No Model.)

Witnesses
Howard D. Orr.
B. G. Foster.

J. C. Humphreys, Inventor:
By C. G. Siggers,
Attorney

UNITED STATES PATENT OFFICE.

JOHN C. HUMPHREYS, OF SUTTON, WEST VIRGINIA, ASSIGNOR OF ONE-HALF TO CLAUDE S. PHILLIPS, OF LANES BOTTOM, WEST VIRGINIA.

VALVE-OPERATING MECHANISM.

SPECIFICATION forming part of Letters Patent No. 711,863, dated October 21, 1902.

Application filed May 24, 1901. Serial No. 61,797. (No model.)

*To all whom it may concern:*

Be it known that I, JOHN C. HUMPHREYS, a citizen of the United States, residing at Sutton, in the county of Braxton and State of West Virginia, have invented a new and useful Valve-Operating Mechanism, of which the following is a specification.

The present invention relates to valve-operating mechanism for washbowls and other analogous receptacles; and one object thereof is to provide novel means whereby a valve may be moved to an operative or inoperative position without the necessity of the operator immersing his hands in the water contained in the receptacle.

A further object is to employ a novel construction which will do away with the necessity of holding-chains or other similar devices within the bowl, thus leaving the entire interior of said bowl clear and free of any valve operating or holding mechanism.

In carrying out the above objects the means described in the following specification and shown in the accompanying drawings is considered preferable; but it will be understood that such changes may be made therefrom as are within the scope of the claims hereto appended.

Figure 1:
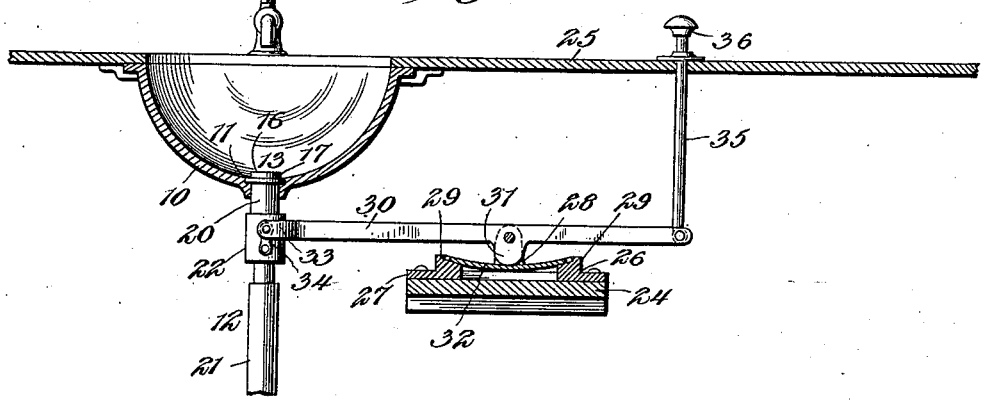
Figure 2:
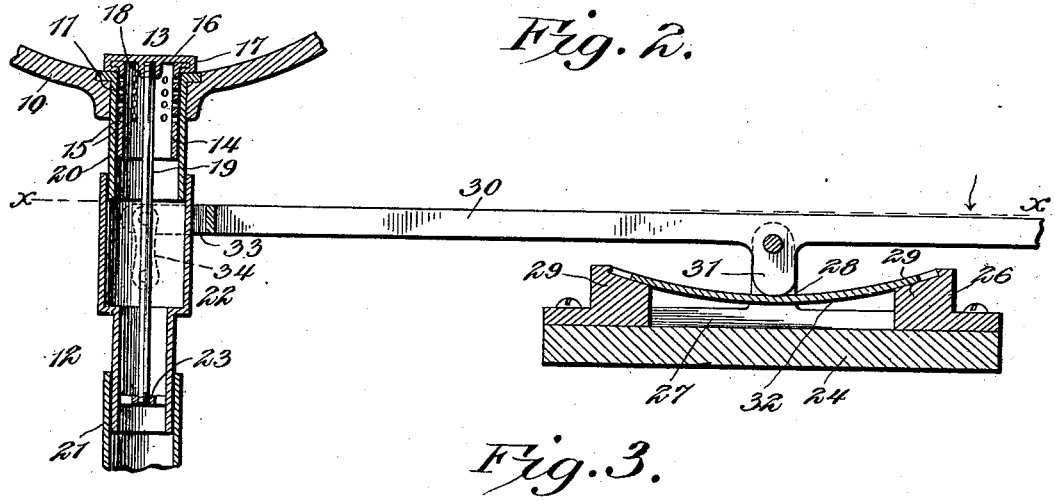
Figure 3:
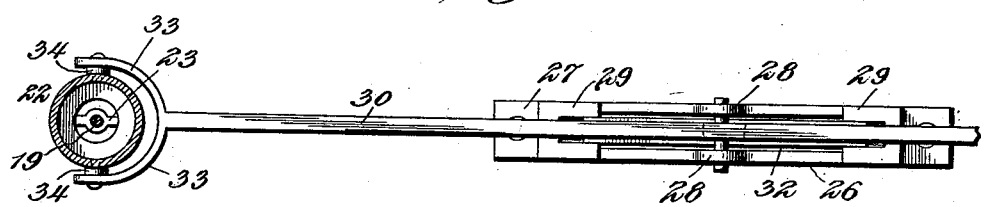

In the drawings, Figure 1 is a vertical section through a washbowl, showing the valve and operating mechanism therefor in elevation. Fig. 2 is a vertical section, on an enlarged scale, through the valve-operating mechanism. Fig. 3 is a cross-section taken on the line X X of Fig. 2.

Similar numerals of reference designate like and corresponding parts in all the figures of the drawings.

In illustrating the application of the present invention an ordinary washbowl is shown, (designated by the reference-numeral 10,) having a central discharge-opening 11 in the bottom, from which leads an eduction-pipe, (designated as a whole by the reference-numeral 12.)

For the purpose of closing the communication between the bowl and eduction-pipe a valve 13 is provided, said valve comprising a tubular casing 14, having a plurality of orifices 15, whereby a strainer is formed. The upper end of this casing is closed by a cap 16, the edge of which projects over the casing to form an annular flange 17, that fits over the edge of the discharge-opening 11. The under face of the cap 16 is provided with a centrally-arranged screw-threaded boss 18, into which is screwed a valve-stem 19, said valve-stem being located longitudinally within, but spaced from, the walls of the casing 14 and projecting below the lower end of said casing.

The eduction-pipe 12 consists of two sections 20 and 21, the adjacent ends of which are spaced apart. The section 20 is secured to the bowl about the discharge-opening, and the section 21 is connected with any desired conducting-pipe. Bridging the space between the adjacent ends of these sections is a sleeve 22, that overlaps said ends by having its upper end surrounding the lower end of the section 20 and its lower end inserted into the upper end of the section 21. This sleeve is freely slidable upon said sections and can thus be raised or lowered, as desired. It is provided, preferably contiguous to its lower end, with a cross-arm 23, into which screws the lower end of the valve-stem 19.

Secured to a suitable horizontal bar 24, which is located below the usual platform 25, is a supporting-bracket 26, which comprises a base 27, having upstanding hinge-ears 28 and raised seats 29 arranged upon the opposite sides of said ears. A lever 30 is pivoted intermediate its ends to the hinge-ears 28 and is provided with a depending friction-lug 31, located directly below the pivot-point. A flat sheet-metal holding-spring 32 has its opposite ends resting in the seats 29 of the bracket and bears against the under side of this friction-lug. One end of the lever 30 is provided with a yoke the arms 33 of which are pivotally secured to the opposite sides of the sleeves 22 by means of a pair of links 34. An operating-rod 35 is secured to the opposite end of the lever 30 and passing through the platform 25 has its upper end projecting above the same and provided with a suitable handle-knob 36.

The operation of the device will be readily understood. By pressing downwardly upon the operating-rod 35 the opposite end of the lever will be raised, thus elevating the sleeve, and consequently the valve carried thereby. This will bring the strainer portion of the casing 14 above the edge of the discharge-opening, and the water will have a free passage-way therethrough and into the discharge-pipe. At the same time any articles will be prevented by means of the strainer from escaping. The holding-spring 32 bearing against the friction-lug 31 will hold the valve in elevated position. In order to close the communication between the discharge-pipe and the bowl, it is only necessary to elevate the operating-rod, whereupon the valve will be lowered and the annular flange thereof will fit snugly about the edge of the discharge-opening. The holding-spring will still bear upon the friction-lug 31 and hold it in this position also. By the construction as set forth, therefore, it will be seen that the valve-operating mechanism is entirely exterior of the bowl. At the the same time the valve is securely held in any position by means of the coacting friction-lug and holding-spring, and because of the arrangement of the sleeve with the discharge-pipe sections there is no danger of leakage.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a receptacle having a discharge-opening, of a valve for closing the opening, said valve comprising a perforated casing, a cap closing the upper end of the casing and projecting over the upper edge of the same to form an annular flange which engages over the edge of the discharge-opening, a valve-stem located longitudinally within and projecting below the lower end of the casing, said stem being secured at its upper end to the under face of the cap, and operating means connected to the projecting end of the stem.

2. In valve-operating mechanism, the combination with a receptacle having a discharge-opening, of a valve for closing the opening, and operating means for the valve, said means including a lever pivoted intermediate its ends and connected to the valve, said lever being provided with an offset projection, and a friction-spring supported at its ends and having an intermediate portion bearing against the projection to hold the lever against movement.

3. In valve-operating mechanism, the combination with a receptacle having a discharge-opening, of a valve for closing the opening, and operating means for the valve, said means including a lever pivoted intermediate its ends and having a connection with the valve at one end, said lever being provided with an offset projection, a friction-spring supported at its ends and having an intermediate portion bearing against the projection of the lever, and an operating-rod connected to the free end of the lever and provided with a handle-knob.

4. In valve-operating mechanism, the combination with a receptacle having a discharge-opening, of a valve for closing the opening, and operating means for the valve, said means including a pivoted lever having an offset projection located adjacent to the pivot, a supporting-bracket upon which the lever is pivoted, said bracket having a pair of seats arranged upon opposite sides of the projection, and a spring having its opposite ends located in the seat and having an intermediate portion bearing against the projection of the lever to hold the latter against movement.

In testimony that I claim the foregoing as my own I have hereto affixed my signature in the presence of two witnesses.

JOHN C. HUMPHREYS.

Witnesses:
C. B. CARLIN,
CARY C. HINER.